3,542,912
ROTATIONAL MOLDING METHOD FOR FORMING MULTILAYERED ARTICLES
Francis J. Rielly, Cherry Hill, N.J., and Harvey Nungesser, Norristown, Pa., assignors to Nypel, Incorporated, West Conshohocken, Pa., a corporation of Delaware
No Drawing. Filed Dec. 12, 1967, Ser. No. 689,758
Int. Cl. B29c 5/04; B29d 9/00
U.S. Cl. 264—241                                                                10 Claims

ABSTRACT OF THE DISCLOSURE

A method for making a multilayered article by rotational casting. A mixture of a plurality of thermoplastics, each having at least a 10° F. difference in melting point from any other thermoplastic in the mixture, is rotatably blended in a mold. Each of the thermoplastics are then melted by heating the mixture to a temperature above the melting point of the highest melting point thermoplastic in the mixture and below the degradation temperature of any of the thermoplastics in the mixture. The mixture of molten thermoplastics is rotated for a time sufficient to achieve a good distribution of material on the inner wall of the mold and the mold is then cooled while rotating to solidify the thermoplastics. The highest melting point thermoplastic is disposed innermost of the article produced and this material may have a density which is higher than others in the article.

---

The present invention is directed to a method for forming a multilayered article.

There has been a longfelt need for forming multilayered hollow articles from non-miscible thermoplastics. Thus, it has proved desirable to secure the structural strength properties, or low cost, of one type of thermoplastic, and yet obtain the resistivity to attack by chemical fluids, imperviousness, or superior heat properties, of another thermoplastic. Thus it has proved desirable to coat thermoplastics, such as polyethylene and polypropylene, which are relatively inert, and cannot be satisfactorily coated with a cohesive layer of another thermoplastic, without the pretreatment of the coated surface by methods such as flaming, electrical discharge, ionizing radiation, chlorination or chemical oxidation.

This invention has as an object the provision of a novel method for forming multilayered hollow articles from a plurality of non-miscible thermoplastics.

Other objects will appear hereinafter.

The multilayered articles of the present invention are made from a plurality of non-miscible [1] thermoplastics, each of which has a melting point which is at least 10° F. different from any other thermoplastic in the mixture. Each thermoplastic should be present in an amount equal to at least 10 weight percent for satisfactory "skin" or coating to be achieved. Thus, in a two-layered article consisting of two thermoplastics, such as a high melting thermoplastic like nylon and a relatively low melting thermoplastic like polyethylene, the weight percent ratio of the nylon to the polyethylene may be between about 10:90 to 90:10.

[1] By non-miscible as used herein is meant a solubility of less than one percent when the thermoplastics are melted together under atmospheric pressure.

In mixtures comprising more than two different thermoplastics, each component should be present in an amount equal to at least 10 weight percent.

The thermoplastics used in the present invention should be finely divided, and preferably sufficiently finely divided to pass through a 35 mesh screen. By way of example, the present invention contemplates the use in the process thereof of powders such as 50 mesh, 100 mesh, and 200 mesh powders.

In the process of the present invention, the plurality of non-miscible thermoplastics are melted together while being rapidly rotated within a mold. Preferably, the mold is simultaneously rotated in both a horizontal and vertical plane. This can be readily accomplished by the use of conventional rotational casting equipment. A variety of such rotational casting equipment for simultaneously rotating molds both vertically and horizontally is presently commercially available. Such equipment is described in detail in Modern Plastics Encyclopedia 1967 in the article by L. A. McKenna entitled Rotational Molding, at pages 780 et seq.

Such rotational molding machinery in which the mold is simultaneously rotated in both vertical and horizontal planes should be used in the formation of multi-layered hollow articles having end walls, such as tanks, containers, barrels, troughs (which can be formed by cutting a cylinder in two), and the like. However, in the formation of hollow articles lacking end walls, such as pipes or ducts, rotational molds which are rotated in only one plane, such as in a vertical plane, may be used.

The rate of rotation of the mold (in the case of rotational casting equipment which rotates simultaneously both in vertical and horizontal planes, such rate of rotation being for each of the planes, which need not be the same) should be such as to give uniform disposition of the molten thermoplastic in the mold. Generally, this should be a rate of at least 20 revolutions per minute; and where the mold is rotated in two planes such rate of at least 20 revolutions per minute should be used for each plane. Superior results may be obtained when the rate of rotation is increased. However, generally, there is no useful purpose served by increasing the rate of rotation of the mold beyond about 100 revolutions per minute. Since the power requirements and cost of rotation increase with the more rapid rotation of the mold, it is not desirable in most instances to rotate the mold at more than about 100 revolutions per minute. Indeed, too rapid rotation of the mold may result in blending of the non-miscible polymers in the finished article, with a lack of well defined discrete layers of different thermoplastics bonded together.

The process of the present invention includes three stages, namely the loading stage in which the mold is loaded with charge; the heating stage in which the non-miscible thermoplastics are rendered molten and rotated together; and the cooling stage in which the molten non-miscible thermoplastics are cooled to their solid states while rotation is continued (although such rotation need not be at the same rate used in the heating stage). The rate of rotation in the cooling stage should generally be between 20 and 100 revolutions per minute, and is frequently the same as in the heating stage.

The process of the present invention contemplates loading the mold with the finely divided powders of each of the non-miscible thermoplastics. The relative weight ratio of the thermoplastics to each other depends on the thickness of the layers.

Normally, the mold is loaded with charge while exposed to the atmosphere. However, if one or more of the thermoplastics making up the charge is adversely affected by oxygen at an elevated temperature, namely while the thermoplastic is in its molten state, the mold may be evacuated, or may contain an inert atmosphere, such as nitrogen, helium, or carbon dioxide.

After the mold is filled with the desired amount of powdered thermoplastics, it passes to the heating stage. In the heating stage, the mold is rotated while being heated, as for example, by heat exchange with a continuous blast or jet of heated fluid, such as hot air. The mold is preferably formed of a highly conductive metal, such as aluminum.

Where the mold is rotated in two planes, it is not necessary that the mold be rotated at the same rate of speed in both vertical and horizontal planes. For example, the mold may be rotated at a speed of 58 revolutions per minute along its vertical axis and 40 revolutions per minute along its horizontal axis, or 72 revolutions per minute along its vertical axis and 60 revolutions per minute along its horizontal axis.

From the heating stage, the mold passes to the cooling stage. If desired, the rotation of the mold may be stopped to facilitate transfer of the mold from the heating stage to the cooling stage. However, in the cooling stage the rotation of the mold is continued, and the mold is cooled by heat-exchange contact with cooled air, cooling water, or other cooling heat-exchange medium. When the mold is cooled so that all of the thermoplastic contents thereof are solidified, the mold may be opened and the article removed therefrom.

The article will have the highest melting thermoplastic innermost, with each adjacent layer being the next highest melting thermoplastic.

By way of example, a cylinder having a height of five inches and a diameter of five inches is molded in a conventional rotational casting machine by using a cylindrical mold of such interior dimensions. The charge to such cylindrical mold is 20 grams of nylon 6 and 180 grams of polypropylene, with the nylon 6 being pulverized to pass through a 35 mesh screen, and the polypropylene being about 100 mesh. The mold is rotated at 58 revolutions per minute on its vertical axis, and 40 revolutions per minute on its horizontal axis. The mold is heated to a temperature of about 550° F. (which is well above the melting point of the nylon 6 which is 420–425° F., and of the polypropylene which is about 335° F.).

The temperature to which the thermoplastic should be heated should be sufficiently high so that the molten thermoplastics achieve good liquid flow. Generally, this temperature should be on the order of at least 20° F. above the melting point of the highest melting thermoplastic, but should be below the temperature at which substantial thermal degradation of any of the thermoplastic occurs.

The time of rotation of the mold in the heating zone is not critical. It should be sufficiently long to achieve good distribution of the molten thermoplastic on the wall surface of the mold. With molds having a somewhat intricate surface, a longer degree of rotation is desirable. Generally, the extent of rotation of the mold is of the order of about 5 to 30 minutes. In most cases, the duration of rotation of the mold in the heating zone will be of the order of about 15 minutes. Generally, rotating the mold in the heating zone for more than about 30 minutes serves no useful purpose and is uneconomical.

From the heating zone, the mold is passed to a cooling zone. In the cooling zone, the mold is cooled by heat-exchange contact with a fluid heat-exchange medium, such as cooled air, cooling water, etc. After all of the thermoplastic within the mold has been solidified by cooling, the mold is opened, and the part removed.

Two-layered articles may be formed from the following thermoplastics.

| Inside layer | Outside layer |
| --- | --- |
| Nylon | Polyethylene. |
| Do | Polypropylene. |
| Do | Polyurethane. |
| Do | Polystyrene. |
| Do | Cellulose acetate. |
| Do | Cellulose propionate. |
| Do | Cellulose acetate butyrate. |
| Do | Acrylonitrile butadiene styrene (ABS). |
| Polycarbonate | Nylon. |
| Nylon | Polyphenylene oxide. |
| Do | Polysulfone. |
| Do | Styrene-butadiene (impact styrene). |
| Do | Polyvinyl chloride. |
| Acetal | Polyethylene. |
| Do | Polypropylene. |
| Polycarbonate | Polyethylene. |
| Do | Polypropylene. |
| Polyphenylene oxide | Do. |
| Polysulfone | Polyethylene. |
| Do | Polypropylene. |
| Polyester | Polyethylene. |
| Do | Polypropylene. |

The following are illustrative of three-layer multilayer articles:

| Inside layer | Middle layer | Outside layer |
| --- | --- | --- |
| Nylon | Acetal | Polyethylene. |
| Do | do | Polypropylene. |
| Polycarbonate | Nylon | Polyethylene. |
| Do | do | Polypropylene. |

The process of the present invention may be used to produce a wide variety of multi-layered hollow articles, such as barrels, tanks, vessels, containers, pipes and troughs.

We do not wish to be bound by any theory as to why the excellent bonds between the layers of the multi-layered articles of the present invention are achieved. However, it is our present belief that such bonds are the result of both mechanical interlocking and partial polymer solubility at each interface.

The present invention may be embodied in other specific forms without departing from the spirit or essential attributes thereof and, accordingly, reference should be made to the appended claims, rather than to the foregoing specification as indicating the scope of the invention.

It is claimed:

1. A method for molding a hollow multilayered article comprising rotatably blending in a mold a plurality of non-miscible finely divided thermoplastics to form a mixture, with each such thermoplastic having a melting point at least 10° F. different from any other thermoplastic in the mixture, and with each such thermoplastic being present in said mixture to the extent of at least about 10 weight percent, melting each of the thermoplastics by heating the mixture to a temperature above the melting point of the highest melting thermoplastic in the mixture and below the temperature at which substantial thermal degradation of any thermoplastic in the mixture occurs, rotating said molten mixture for a time sufficient to achieve good distribution of the molten thermoplastic on the inner wall surface of the mold, cooling said mold while rotating it to solidify all of the thermoplastic, and removing from the mold a multilayered article having the highest melting thermoplastic innermost, said highest melting point thermoplastic having a higher density than at least one other of said plurality of thermoplastics.

2. A method in accordance with claim 1 in which two thermoplastics form the mixture.

3. A method in accordance with claim 2 in which the thermoplastics are nylon and polyethylene.

4. A method in accordance with claim 2 in which the thermoplastics are nylon and polypropylene.

5. A method in accordance with claim 1 in which the mold is simultaneously rotated in a plurality of planes during both the heating and cooling stages.

6. A method in accordance with claim 1 in which each finely divided thermoplastic of the mixture is sufficiently finely divided to pass through a 35 mesh screen.

7. A method in accordance with claim 1 in which the mold is rotated between about 20 and 100 revolutions per minute during both the heating and cooling stages.

8. A method in accordance with claim 7 in which the mold is rotated for between about 5 to 30 minutes during the heating stage.

9. A method in accordance with claim 1 in which the thermoplastic mixture is heated to a temperature at least about 20° F. above the melting point of the highest melting thermoplastic in the mixture.

10. A method for molding a hollow multilayered article comprising rotatably blending in a mold a plurality of non-miscible finely divided thremoplastics to form a mixture, with each such thermoplastic having a melting point at least 10° F. different from any other thermoplastic in the mixture, and with each such thermoplastic being present in said mixture to the extent of at least about 10 weight percent, melting each of the thermoplastics by heating the mixture to a temperature at least about 20° F. above the melting point of the highest melting thermoplastic in the mixture and below the temperature at which substantial thermal degradation of any thermoplastic in the mixture occurs, rotating said molten mixture for between about 5 to 30 minutes so as to achieve good distribution of the molten thermoplastic on the inner wall surface of the mold at a rate of between 20 to 100 revolutions per minute, cooling said mold while rotating it at a rate of between about 20 and 100 revolutions per minute to solidify all of the thermoplastic, and removing from the mold a multilayered article having the highest melting thermoplastic innermost, said highest melting point thermoplastic having a higher density than at least one other of said plurality of thermoplastics.

References Cited

UNITED STATES PATENTS

| 2,887,728 | 5/1959 | Usab | 264—311 X |
| 3,309,439 | 3/1967 | Nonweiler | 264—311 X |

FOREIGN PATENTS

| 17,904 | 8/1965 | Japan. |

OTHER REFERENCES

Modern Plastics, "New Dimensions in Rotomolding," April 1966, pp. 90 and 187.

ROBERT F. WHITE, Primary Examiner

J. H. SILBAUGH, Assistant Examiner

U.S. Cl. X.R.

264—311